(12) United States Patent
Picher-Dempsey

(10) Patent No.: US 6,779,031 B1
(45) Date of Patent: Aug. 17, 2004

(54) NETWORK ARCHITECTURE WITH EVENT LOGGING

(75) Inventor: Heidi Picher-Dempsey, Littleton, MA (US)

(73) Assignee: Level 3 Communications, Inc., Broomfield, CO (US)

(*) Notice: Subject to any disclaimer, the term of this patent is extended or adjusted under 35 U.S.C. 154(b) by 0 days.

(21) Appl. No.: 09/362,781

(22) Filed: Jul. 28, 1999

Related U.S. Application Data

(63) Continuation-in-part of application No. 08/990,096, filed on Dec. 12, 1997.

(51) Int. Cl.[7] .......................... H04L 12/28; H04L 12/66; H04L 9/00; G06F 15/173
(52) U.S. Cl. .................. 709/224; 709/227; 370/395.21; 370/400; 370/352; 713/200
(58) Field of Search ................................. 709/228, 229, 709/227, 223, 224; 370/230, 235, 400, 401, 392, 389, 402, 410, 353–356, 395.21, 241, 244, 248, 250; 705/34; 713/166, 164, 165, 200

(56) References Cited

U.S. PATENT DOCUMENTS

| | | | | |
|---|---|---|---|---|
| 5,960,189 A | * | 9/1999 | Stupek, Jr. et al. | 717/169 |
| 5,974,237 A | * | 10/1999 | Shurmer et al. | 709/224 |
| 5,987,430 A | * | 11/1999 | Van Horne et al. | 705/34 |
| 6,003,077 A | * | 12/1999 | Bawden et al. | 709/223 |
| 6,041,041 A | * | 3/2000 | Ramanathan et al. | 370/241 |
| 6,047,322 A | * | 4/2000 | Vaid et al. | 709/224 |
| 6,058,163 A | * | 5/2000 | Pattison et al. | 379/34 |
| 6,134,591 A | * | 10/2000 | Nickles | 709/229 |
| 6,145,001 A | * | 11/2000 | Scholl et al. | 709/223 |
| 6,192,034 B1 | * | 2/2001 | Hsieh et al. | 370/241 |
| 6,347,339 B1 | * | 2/2002 | Morris et al. | 709/237 |
| 6,389,464 B1 | * | 5/2002 | Krishnamurthy et al. | 709/220 |
| 6,609,154 B1 | * | 8/2003 | Fuh et al. | 709/225 |
| 6,636,894 B1 | * | 10/2003 | Short et al. | 709/225 |

OTHER PUBLICATIONS

F. Baker et al., ftp://ftp.ietf.org/internet-drafts/draft-ietf-rsvp-v2-mib-00.txt (Jul. 1997).
TCP/IP Application Protocols, Simple Network Management Protocol (SNMP), 13.1.5, p. 769–773.

\* cited by examiner

*Primary Examiner*—Hanh Nguyen
(74) *Attorney, Agent, or Firm*—Faegre & Benson LLP

(57) ABSTRACT

In a wide area network arrangement composed of a number of secure local networks and an Internet service provider (ISP) back-bone having an ISP quality of service (QoS) module and an Event Server. LAN hosts indirectly access network routers to monitor a communication session. The QoS module and the Event Server work together to identify and collect session startup/teardown events and to collect certain network router state data. The state data is stored as a Management Information Base (MIB) object that can be accessed by the ISP using ordinary Simple Network Management Protocol (SNMP) messaging.

18 Claims, 3 Drawing Sheets

NETWORK ARCHITECTURE WITH EVENT LOGGING

RELATED APPLICATIONS

This application is a continuation-in-part (CIP) application of U.S. Ser. No. 08/990,096 entitled Secure Network Architecture with Quality of Service, filed on Dec. 12, 1997, which is hereby incorporated by reference.

BACKGROUND OF THE INVENTION

The present invention relates generally to network communication and, more particularly to gathering and identifying session startup/teardown information and network router state information that may be used for Internet Service Provider (ISP) billing purposes.

In order for an Internet Service Provider (ISP) to be able to charge different rates for different levels of service (i.e., sessions that request special quality of service (QoS) or multicast. service), it is necessary for the ISP to be able to collect and store information relative to user sessions. Currently, routers are not generally being designed with Management Information Bases (MIBs) that allow the ISP to monitor the state of the routers contained in a network because of the additional effort and computing resources that would be required. An MIB stores information associated with a network/internet management data.

In conventional networks, Simple Network Management Protocol (SNMP) messaging has been used to access information from certain network elements relative to the performance of the network. SNMP relates to the management aspects of the network such as fault, security, and accounting management. SNMP messages are used to access information stored in a MIB, but without an MIB. Routers do not contain a MIB, however, and therefore routers cannot store state information. For this reason, SNMP messaging cannot be used to monitor the state data of an ISP router/network.

Therefore, a need exists for a system that gathers and logs network event information using SNMP messaging. The solution should enable routers within the system to return state information so that ISPs can better track and monitor the types of services its users request.

SUMMARY OF THE INVENTION

Systems and methods consistent with the present invention provide a QoS server that stores and monitors user sessions with SNMP messages. In addition, the QoS server gathers event startup/teardown information and network router state information, and stores this information in a format that can then be easily accessed by an ISP QoS module using SNMP messaging tools.

Systems and methods consistent with the present invention provide a system for monitoring a communication session between an originating router and a destination router. The system includes: means for periodically transmitting a state query message to the originating router, the state query message including a request for internal router information data; means for receiving, at a node server coupled to the originating router, state information data from the originating router in response to the state query message; means for storing the state information data as an object; means for monitoring the object to detect a change in the state information data; and means for logging a session event when the monitoring means detects the change in the state information data.

A server system, consistent with the present invention, includes means for receiving a session request for establishing a communication path to transmit information, means for sending a message to an originating router in the communication path in response to the request, the message including a request to reserve resources for transmitting the information, and means for monitoring the originating router to determine whether all of the routers along the transmission path have sufficient resources to establish the communication path in accordance with the session request.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments of the invention and, together with the description, explain the advantages and principles of the invention. In the drawings.

DETAILED DESCRIPTION

Figure 1:
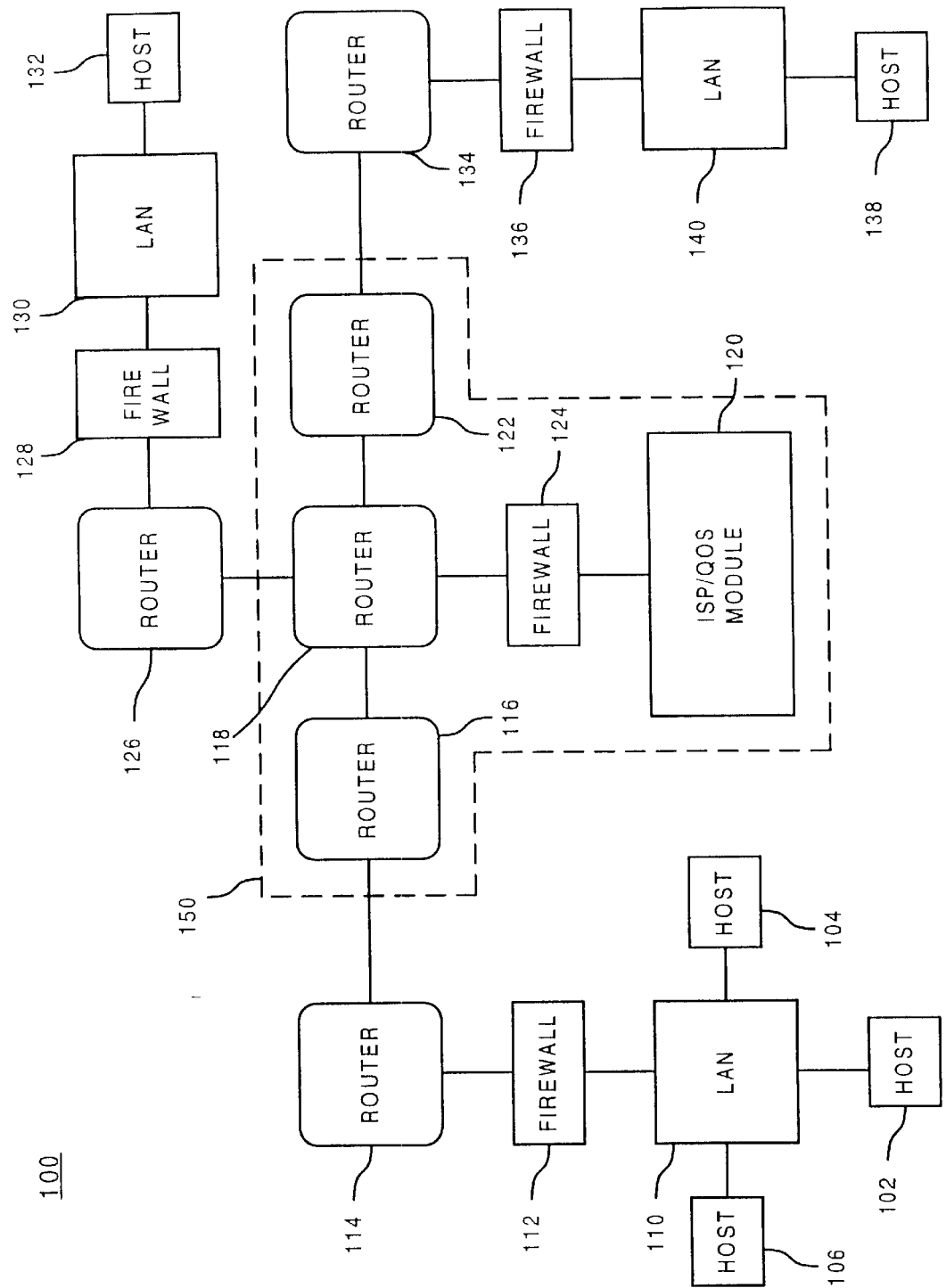
FIG. 1 is a block diagram of a network architecture consistent with the present invention.

Reference will now be made to preferred embodiments of this invention, examples of which are shown in the accompanying drawings and will be obvious from the description of the invention. In the drawings, the same reference numbers represent the same or similar elements in the different drawings whenever possible.

FIG. 1 is a block diagram of secure network 100 consistent with the present invention. An Internet Service Provider (ISP) maintains a wide area network (WAN) 150 to which are attached several local area networks LANs 110, 130, and 140. WAN 150 includes a number of interconnected WAN routers 116, 118, and 122, typically referred to as a "Backbone," and at least one IP/QoS module 120 with an associated firewall 124. WAN routers 116, 118, and 122 are RSVP-capable and might include, for instance, Cisco 7507 routers running the Cisco 11.2 Internet Operating System (IOS). In addition to providing standard best-effort Internet Protocol Service, the WAN routers receive packets of information from the LANs, determine whether the packets have been designated for QoS, and if so, transmit the packets to a destination router in a manner that provides the proper QoS.

As shown in FIG. 1, IP/QoS module 120 and associated firewall module 124 are located at a QoS hosting site of the ISP. Firewall module 124 monitors traffic to the site, ensuring that all traffic comes from registered and authorized users. Firewall modules are commercially available and could be, for instance, an IBM/PC with IP security software (IPSEC). IP/QoS module 120 could be any workstation running, for example, the Solaris 2.5 or similar operating system. Firewall 124, associated with IP/QoS module 120, connects to router 118 by a communication line, such as a T1, and to IP/QoS module 120 via a local communication line, such as an Ethernet connection.

IP/QoS module 120 provides a session reservation setup application to the user upon request, accepts requests for QoS from users, transmits these user QoS requests to the WAN routers, monitors the routers to determine whether the QoS request has been established, and then notifies the user of the state of the QoS request. In addition, as explained in detail below, IP/QoS module 120 monitors router state information data and provides MIB format objects that can be retrieved via SNMP messaging. This feature allows the ISP to monitor the conditions of the routers within the network and the activities performed by users of the system.

As also shown in FIG. 1, premises router 114, 126, and 134 are connected to the WAN routers 116, 118, and 122, respectively, via communication lines, such as T1 lines. The premises routers serve as the "originating/destination" routers in the network. Firewall 112 connects to premises router 114, by a local communication line, such as a T1 line, and monitors LAN 110 via a local communication line, such as an Ethernet connection, to monitor traffic into the LAN. LAN 110 supports some number of users, such as hosts 102, 104, and 106 in FIG. ÿ1. Each host platform could be any personal computer or workstation computer running browser software, such as Netscape 3.0 or Internet Explorer 3.0 software. Firewalls 128 and 136 are similarly attached to premises routers 126 and 134, respectively, and monitor traffic into LANs 130 and 140, respectively. LANs 130 and 140 are shown as supporting hosts 132 and 138, respectively, although more hosts could be supported.

Figure 2:
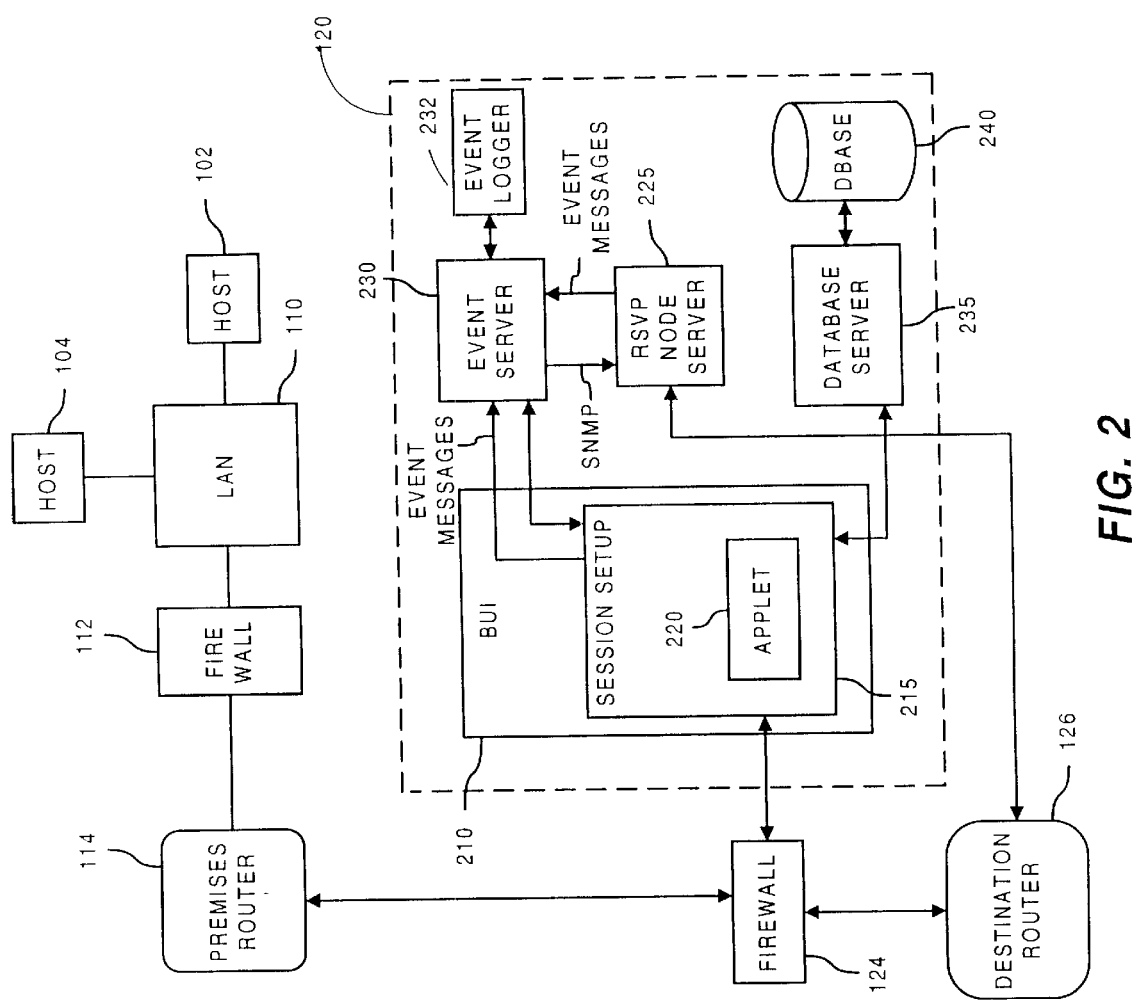
FIG. 2 is a block diagram of the IP/QoS module of FIG. 1.

FIG. 2 shows a block diagram of IP/QoS module 120 along with certain WAN and LAN elements. The LAN, hosts, firewalls, premises router, and WAN router include the interconnection communications lines described above with reference to FIG. 1. For purposes of illustration, router 114 has been depicted as a premises router, while router 126 is depicted as a destination router. IP/QoS module 120 includes a browser user interface (BUI) 210, a session setup server 215 with a setup applet 220, an RSVP node server 225, an event server 230, an event logger 232, and a database server 235 with a corresponding database module 240.

In general, IP/QoS module 120 executes software instructions read into a main memory from another computer-readable media. Execution of the sequences of instructions contained in the main memory (not shown) causes module 120 to perform the process steps described herein. In an alternative embodiment, hard-wired circuitry may be used in place of or in combination with software instructions to implement the invention. Thus, embodiments of the invention are not limited to any specific combination of hardware circuitry and software.

The term "computer-readable medium" as used herein refers to any media that participates in providing instructions for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infrared data communications.

Common forms of computer-readable media include, for example, a floppy disk, a flexible disk, hard disk. magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described hereinafter, or any other medium from which a computer can read.

BUI 210 provides all the client functions, including the RSVP setup functionality, which are available to an authorized user based on the level of the user profile. RSVP setup functionality is described in detail in commonly assigned application Ser. No. 990,096, which was previously incorporated by reference. Session setup server 215 accepts and executes requests from the host to add or remove sessions. The sessions supported include RSVP point-to-point or multi-point sessions. Session setup applet 220 specifically enables an authorized user to setup and tear down RSVP sessions. The level of functionality within the applet depends upon the user type and realm (i.e., a logical grouping of customer sites of which the user is part).

Event Server 230 is a daemon that collects events from other QoS servers, such as RSVP node server 225, and forwards those events to other servers or client functions. Event Server 230 handles user, router and multicast event types and gathers event messages from session setup server 215 and RSVP node server 225. Further, event server 230 transmits SNMP messages to RSVP node server 225. Event Logger 232 logs or stores the router event information used to monitor the state of the routers within system 100. RSVP node server 225 periodically polls routers, such as destination router 126 and premises router 114, to determine the state of requested sessions. The sessions supported are RSVP point-to-point or multi-point sessions. Lastly, database server 235 accepts all queries from the IP/QoS server modules and functions. This database stores all IP/QoS module 120 information about user administration, address administration, and RSVP session tables.

As shown in FIG. 2, BUI 210 acts as an interface between the user and the IP/QoS to functionality, including the event logging functionality. The user sends all requests for QoS functionality to BUI 210 and BUI 210 makes all responses to these requests available to the user. Running within BUI 210, session setup server 215 permits authorized users to log onto IP/QoS module 120 and to make reservation requests. Running within session setup server 215, session setup applet 220 downloads user interface software in an object-oriented computer language such as the JAVA™ programming language to the host, providing a graphic interface to BUI 210.

As also shown in FIG. 2, database module 240 provides an essential back end to IP/QoS module 120. Session, setup server 215 uses database module 240 to provide, via database server 235, user information such as user name, password, user level (e.g., desktop user, system analyst, network operation center), access level (none, some, all), domain name, and other relevant information. Database module 240 is first accessed when the user enters BUI 210 to verify the users name, password, user level, etc. and then again when the user submits a QoS request, to identify the domain, router names, session definitions, etc. Although database module 240 is not necessarily required to establish a QoS session, it is more preferable than establishing each session by hand.

Figure 3:
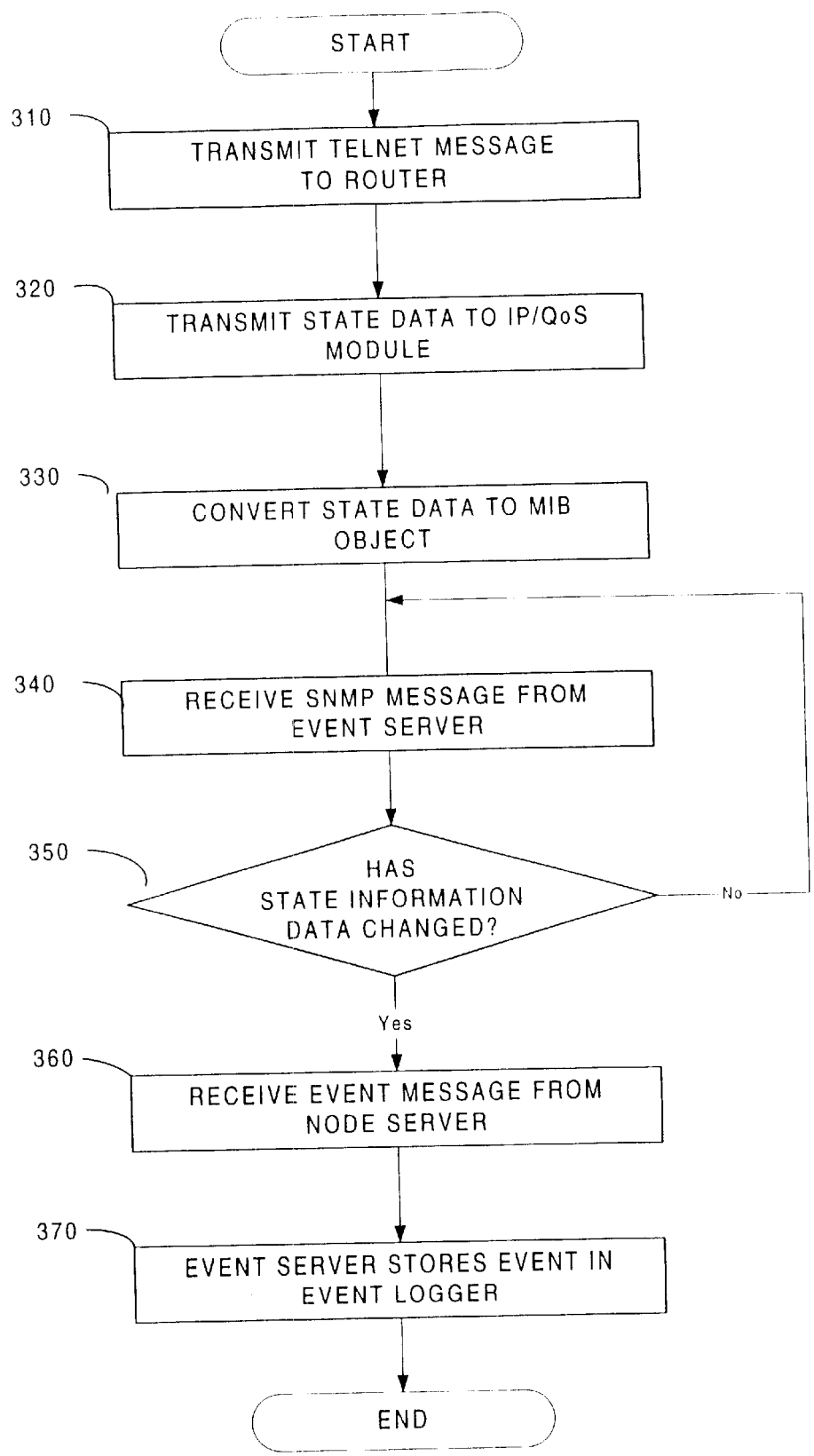
FIG. 3 is a flowchart showing steps, consistent with the present invention, for provision event logging.

FIG. 3 is a flow chart showing steps of a method for logging event information data that occurs during a communication session for use with the systems and methods consistent with the present invention. First, session setup server 215, residing on the ISP/QoS module 120, runs an expect script that generates Telnet messages (step 310). The Telnet messages are sent, at regular intervals, to the network routers to query the routers (e.g., premises router, 114), referred to as network nodes, to request node data of interest to the ISP. This node data could be, for example, the identity of a flow's source and destination or the reservation sizes and packets through "flows" that have been reserved in the router.

Next, the routers return the node data is returned to ISP/QoS module 120 (step 320), ISP/QoS module 120 then converts the node data to a special "MIB-like" object and stores it in database 240 (step 330). To accomplish this feature, RSVP node server 225 processes data received from the nodes as a result of running the expect script and organizes this data for temporary storage in the MIB-like object. The data in this object can then be accessed by SNMP messages generated by Event Server 230 (step 340).

The MIB-like object serves as a temporary storage location for the node data and the data is continually updated as it is stored in the object. Once this object is created, SNMP messages generated by Event Server 230 are transmitted to Node Server 225 for regularly queries to the object to determine if the state of the node data has changed (step 350). A change in state data could be indicated when a new source or destination is established or new RSVP request setup messages are received. If the state data has changed, the state information is time-stamped by Node Server 225 and then transmitted to Event Server 230 for processing (step 360). Finally, the state information can then be stored by Event Server 230 in Event Logger 235 (step 370). The logged data may then be accessed by the ISP for billing purposes or by the user to monitor the state of their sessions. If the state has not changed, the SNMP messages from Event Server 230 regularly query Node Server 225 until the data in the: MIB-like object is altered or changed in some manner (steps 340 and ȳ350).

It will be apparent to those skilled in the art that various modifications and variations can be made to disclosed embodiments of the present invention without departing from the scope or spirit of the invention. Other embodiments of the invention will be apparent to those skilled in the art from consideration of the specification and practice of the embodiments of the invention disclosed herein. The specification and examples should be considered exemplary, with the true scope and spirit of the invention being indicated by the following claims and their full range of equivalents.

What is claimed is:

1. A system for monitoring a communication session between an originating router and a destination router, comprising:
   a means for periodically transmitting a state query Telnet message to the originating router, the state query Telnet message including a request for internal router information data;
   a means for receiving, at a node server coupled to the originating router, state information data from the originating router in response to the state query Telnet message;
means for converting and storing the state information data as a Management Information Base (MIB)-like object;
   means for monitoring the MIB-like object to detect a change in the state information data where the monitoring means includes:
      a means for time-stamping the state information data upon detecting a change in the state information data; and
      a means for transmitting the time-stamped state information data and the session event message; and
   a means for logging a session event when the monitoring means detects the change in the state information data, wherein the logging means resides in an event server coupled to the node server and wherein the logging means includes:
      a means for transmitting a Simple Network Management Protocol (SNMP) message from the event server to the node server:
      a means for receiving state information data in response to the SNMP message; and
      a means for storing the time-stamped state information data when the session event message is received.

2. A system according to claim 1, wherein the transmitting means includes;
   a means for executing an expect script to generate the state query Telnet message.

3. A method for monitoring a communication session in a communication system, comprising:
   periodically transmitting a state query Telnet message to the originating router, the state query Telnet message including a request for internal router information data;
   receiving, at a node server coupled to the originating router, state information data from the originating router in response to the state query Telnet message;
   converting the state information to a Management Information Base (MIM)-like object;
   storing the MIB-like object;
   monitoring the MIB-like object to detect a change in the state information data wherein monitoring includes:
      time-stamping the state information data; and
      transmitting the time-stamped state information data and the session event message upon determining the state information data has changed; and
   logging a session event when the monitoring means detects change in the state information data, wherein the originating router is coupled to a node server, and wherein the step of logging includes:
      transmitting a Simple Network Management Protocol (SNMP) message form an event server to the node server;
      receiving, at the event server, the state information data in response to the SNMP message; and
      storing the time-stamped state information data upon receiving the session event message.

4. A method according to claim 3, wherein the step of transmitting includes:
   executing an expect script to generate the state query Telnet.

5. A method according to claim 3, wherein the internal node data includes node routing data and session setup data, and wherein the step of transmitting includes the substep of
   requesting the node routing data and the setup data from the originating router with the SNMP message.

6. A method according to claim 3, further including the step of
   continually receiving the node routing data and the setup data in response to the SNMP message.

7. A server for monitoring session events in a network communication system, having at least one router, the router comprising:
   a node server module configured to periodically transmit a state query Telnet message to the originating router, the state query Telnet message including a request for internal router state data, the node server module including means for presenting a state query Telnet message to the router;
   a means for storing the internal router state data received in response to the state query Telnet message as a Management Information Base (MIB)-like object;
   a means for continually updating the MIB-like object upon receiving the internal router state data;
   a means for time-stamping the updated MIB-like object; and
   a means for transmitting the time-stamped MIB-like object and session event message to event server module when a chance occurs in the MIB-like object; and
   an event server module configured to log a session event when a state change is detected in the internal router state data, wherein the event server module includes:

a means for transmitting a Simple Network Management Protocol (SNMP) message to the node server module, the SNMP message including a request for the internal router state data of the originating router;

a means for receiving the time-stamped MIB-like object and the session event message from the node server module in response to the SNMP message; and a means for storing the time-stamped MIB-like object when the session event message is received.

8. A system for monitoring a communication session between an originating router and a destination router, comprising:

a means for periodically transmitting a state query message to the originating router, the state query message including a request for internal router information data;

a means for receiving, at a node server coupled to the originating router, state information data from the originating router in response to the state query message;

means for converting and storing the state information data as a Management Information Base (MIB)-like object;

a means for monitoring the MIB-like object to detect a change in the state information data; and a means for logging a session event when the monitoring means detects the change in the state information data, wherein the logging means resides in an event server coupled to the node server and wherein the logging means includes:

a means for transmitting a Simple Network Management Protocol (SNMP) message form the event server to the node server;

a means for receiving state information data in response to the SNMP message; and a means for storing the time-stamped state information data when the session event message is received.

9. A system according to claim 8, wherein the monitoring means includes:

a means for time-stamping the state information data upon detecting a change in the state information data; and a means for transmitting the time-stamped state information data and the session event message.

10. A system according to clam 8, wherein the transmitting means includes a means for executing an expect script to generate the state query message.

11. A system for monitoring a communication session between an originating router and a destination router, comprising:

a means for periodically transmitting a state query Telnet message to the originating router, the state query Telnet message including a request for internal router information data;

a means for receiving, at a node server coupled to the originating router, state information data from the originating router in response to the state query Telnet message;

means for converting and storing the state information data as a Management Information Base (MIB)-like object;

a means for monitoring the MIB-like object to detect a change in the state information data; and a means for logging a session event when the monitoring means detects the change in the state information data, wherein the logging means resides in an event server coupled to the node server and wherein the logging means includes:

a means for transmitting a Simple Network Management Protocol (SNMP) message from the event server to the node server;

a means for receiving state information data in response to the SNMP message;

a means for storing the time-stamped state information data when the session event message is received; and wherein the SNMP message continually requests internal node data of the originating router, wherein the internal router information includes node routing data session setup data, and wherein the means for transmitting includes a means for requesting the node routing data and the setup data with the SNMP message.

12. A system according to claim 11, wherein the monitoring means includes:

a means for time-stamping the state information data upon detecting a change in the state information data; and a means for transmitting the time-stamped state information data and the session event message.

13. A system according to claim 11, wherein the transmitting means includes:

a means for executing an expect script to generate the state query Telnet message.

14. A method for monitoring a communication session in a communication system, the method comprising:

periodically transmitting a state query Telnet message to the originating router, the state query Telnet message including a request for internal router information data;

receiving at a node server coupled to the originating router, state information data from the originating router in response to the state query Telnet message;

converting the state information to a Management Information Base (MIB)-like object;

storing the MIB-like object;

monitoring the MIB-like object to detect a change in the state information data; and logging a session event when the monitoring means detects the change in the state information data, wherein the originating router is coupled to a node server, and wherein the step of logging includes:

transmitting a Simple Network Management Protocol (SNMP) message from an event server to the node server;

receiving, at the event server, the state information data in response to the SNMP message; and storing the time-stamped state information data upon receiving the session event message.

15. A method according to claim 14, wherein the internal node data includes node routing data and session setup data, and wherein the step of transmitting includes:

requesting the node routing data and the setup data from the originating router with the SNMP message.

16. A method according to claim 15, further includes:

continually receiving the node routing data and the setup data in response to the SNMP message.

17. A method according to claim 14, wherein the transmitting includes:

executing an expect script to generate the state query Telnet.

18. A rod according to claim 14, wherein the monitoring includes:

time-stamping the state information data; and transmitting the time-stamped state information data and the session event message upon determining the state information data has changed.

* * * * *

UNITED STATES PATENT AND TRADEMARK OFFICE
CERTIFICATE OF CORRECTION

PATENT NO. : 6,779,031 B1
DATED : August 17, 2004
INVENTOR(S) : Picher-Dempsey

It is certified that error appears in the above-identified patent and that said Letters Patent is hereby corrected as shown below:

Column 5,
Line 49, -- a -- should be inserted prior to "means";
Line 50, -- , -- should be inserted after "data";
Line 50, "where" should be changed to -- wherein --;

Column 6,
Line 2, ";" should be changed to -- : --;
Line 14, "MIM" should be changed to -- MIB --;
Line 17, -- , -- should be inserted after "data";
Line 23, -- the -- should be inserted prior to "change";

Column 8,
Line 60, "rod" should be changed to -- method --.

Signed and Sealed this

Twenty-eighth Day of June, 2005

JON W. DUDAS
*Director of the United States Patent and Trademark Office*